(No Model.)
M. HATFIELD.
ICE TONGS.
No. 297,393. Patented Apr. 22, 1884.
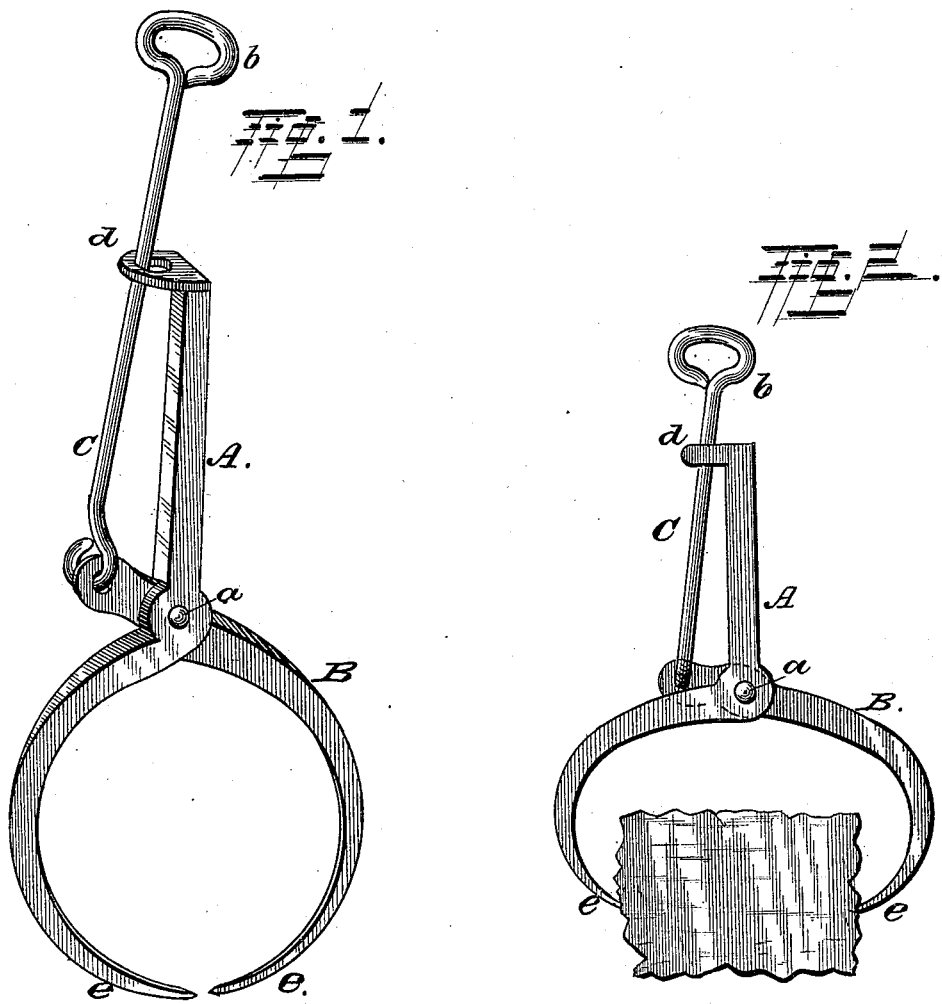
WITNESSES:
Fred. G. Dieterich.
C. I. King.
Mahlon Hatfield,
INVENTOR.
Rob't Vose, ATTORNEY

UNITED STATES PATENT OFFICE.

MAHLON HATFIELD, OF MARSHALL, MISSOURI.

ICE-TONGS.

SPECIFICATION forming part of Letters Patent No. 297,393, dated April 22, 1884.

Application filed March 1, 1884. (No model.)

*To all whom it may concern:*

Be it known that I, MAHLON HATFIELD, a citizen of the United States, residing at Marshall, in the county of Saline and State of Missouri, have invented certain new and useful Improvements in Ice-Tongs, of which the following is a specification, reference being had therein to the accompanying drawings, in which—

Figure 1 is a perspective view of the tongs; and Fig. 2 shows the implement in use, the jaws being closed upon a piece of ice.

This invention relates to improvements in that class of implements used in the handling of ice, either as it is being gathered and placed in the ice-house or during its distribution to consumers.

The ice-tongs in common use are objectionable, as unless both handles are in the grasp of the user they are liable to slip from the ice held between their jaws, and if the block of ice be large it is impossible to bring the handles so close together as to allow them both to be grasped in one hand. Consequently much ice is lost during the process of delivery in cities, by pieces slipping from the tongs and being broken into small fragments by its fall upon the pavements. To remedy this defect and consequent loss I construct my tongs in such a manner that the clamping strain is brought to a single point, at which point is placed the hand-hold, in small tongs used in distribution, or a ring to which the handling or lifting rope is attached in the larger implements used in handling ice at the ice-houses. By this arrangement all the strain is applied to the jaws that are in contact with the ice, the amount of pressure exerted by the jaws being directly in proportion to the weight of the piece handled. The form of that portion of my improved tongs below their pivoted junction, and of the jaws which come in contact with the ice, may be the same as that of the tongs in common use; but here the resemblance ceases, as instead of continuing the crossed arms an equal distance beyond the pivot and terminating them in hand-holds or rings, one of the arms in the improved implement is made much longer than the other, and is provided with a ring at its extremity, through which passes a rod or bar pivotally attached to the short arm of the tongs, and having at its opposite end a hand-hold or ring, to which the power used in operating the implement is applied. It will therefore be apparent that all the power applied at this single point will continually tend to force the jaws into contact with the ice and toward each other, thus causing them to take and retain a firm grip upon the ice until it is purposely released.

Referring to the drawings, A represents the long arm of the tongs, and B the short arm. These two arms cross and are pivoted to each other at *a*. To one end of the short arm B is pivotally attached a bar, C, provided at the opposite end from that attached to the arm B with a hand-hold or ring, *b*, to which the power used in operating the implement is applied. This bar C passes through a ring, *d*, attached to the end of the long arm A, moving freely therein.

It is evident that when the jaws *e e*, forming the ends of the arms A B, are spread apart—as in grasping a piece of ice—power applied to the hand-hold *b* to lift the ice will cause the jaws to approach each other, and that the pressure of said jaws upon the ice will be in exact proportion to the weight of the latter, thus avoiding the danger of crushing a small piece of ice, or allowing a large piece to slip—accidents frequently happening with the tongs in ordinary use, where the amount of pressure applied to the ice by the jaws is governed only by the judgment of the user.

I am aware that a grapple having one long and one short arm has been invented, as shown by the patent of W. E. Derrick, January 12, 1869, said grapple being intended for use as a support to a hay-fork. I do not therefore claim the devices shown in the above-named patent; but What I do claim is as follows:

As an improvement in ice-tongs, the curved arm or jaw A, having a straight extension terminated by the loop *d*, in combination with the short curved arm B, pivoted to the arm A, and provided with an eye to which is attached the bar C, passing through the loop *d*, and terminating in a hand-hold or loop, *b*, all the parts being constructed and arranged for joint operation in the manner shown and described.

In testimony whereof I hereunto affix my signature in presence of two witnesses.

MAHLON HATFIELD.

Witnesses:
 JNO. B. PERKINS,
 A. T. IRVINE.